United States Patent [19]

Tatsuta

[11] Patent Number: 5,231,558
[45] Date of Patent: Jul. 27, 1993

[54] MULTILAYER CERAMIC CAPACITOR AND METHOD OF MANUFACTURE THEREOF

[75] Inventor: Mamoru Tatsuta, Kyoto, Japan

[73] Assignee: Rohm Co., Ltd., Kyoto, Japan

[21] Appl. No.: 935,592

[22] Filed: Aug. 26, 1992

[30] Foreign Application Priority Data

Sep. 17, 1991 [JP] Japan .................. 3-236102

[51] Int. Cl.$^5$ .................. H01G 4/12; H01G 7/00; C04B 35/46
[52] U.S. Cl. .................. 361/321; 29/25.42; 501/138
[58] Field of Search .................. 361/321, 328, 329; 501/136–139; 29/25.42

[56] References Cited

U.S. PATENT DOCUMENTS

| | | | |
|---|---|---|---|
| 4,379,319 | 4/1983 | Wilson | 361/321 |
| 4,379,854 | 4/1983 | Soong | 501/138 |
| 5,130,281 | 7/1992 | Sano et al. | 501/138 |

Primary Examiner—Donald A. Griffin
Attorney, Agent, or Firm—Thomas R. Morrison

[57] ABSTRACT

There is provided structure and a manufacturing method of a multilayer ceramic capacitor which realizes a low rate of change in electrostatic capacity, a small size, high capacity and low manufacturing cost. A plurality of ceramic sheets (S1 to S10) having different Curie points are applied by carbonaceous ink (2) and laminated. By subjecting to sintering, the carbonaceous ink (2) is incinerated with the result that a plurality of empty layers (4) are formed. Thereafter, lead or the like is poured into empty layers (4) so as to form a plurality of internal electrodes (41 and 42). Due to a multilayer structure made up of a plurality of ceramic sheets having different Curie points, a low rate of change in electrostatic capacity is realized on the basis of the logarithmic mixing law. Further, in the sintering step, intervening empty layers (4) between every adjoining ceramic sheets prevent the diffusion of ceramic materials. Moreover, subsequent to the sintering step, internal electrodes (41 and 42) are formed by pouring an electrode material, for example, lead, into empty layers (4). This allows low manufacturing cost and a small capacitor size.

18 Claims, 6 Drawing Sheets

FIG. 4A  ELECTROSTATIC CAPACITY AND RATES OF CHANGE IN ELECTROSTATIC CAPACITY AT SPECIFIED TEMPERATURES.

| °C | S1 | S2 | S3 | S4 | S5 | S6 | S7 | S8 | S9 | S10 | TOTAL/10 | RATE OF CHANGE Δc/c (%) |
|---|---|---|---|---|---|---|---|---|---|---|---|---|
| -55 | 25.9 | 19.1 | 10.0 | 4.3 | 3.7 | 2.9 | 2.5 | 2.2 | 1.9 | 1.6 | 7.41 | -2.11 |
| -25 | 15.4 | 17.5 | 19.4 | 6.6 | 5.2 | 3.9 | 3.3 | 2.7 | 2.3 | 1.9 | 7.82 | 3.30 |
| -10 | 10.6 | 12.3 | 17.1 | 9.7 | 6.4 | 5.1 | 4.3 | 3.1 | 2.4 | 2.1 | 7.31 | -3.43 |
| 0 | 7.9 | 9.6 | 12.8 | 14.2 | 7.7 | 6.3 | 5.1 | 3.5 | 2.6 | 2.3 | 7.20 | -4.89 |
| 10 | 6.0 | 7.5 | 9.5 | 16.9 | 10.1 | 8.0 | 6.3 | 4.2 | 2.8 | 2.4 | 7.37 | -2.64 |
| 20 | 4.8 | 5.9 | 6.1 | 14.1 | 14.5 | 10.9 | 8.3 | 5.2 | 3.2 | 2.7 | 7.57 | 0 |
| 30 | 3.7 | 4.6 | 5.6 | 9.8 | 12.4 | 15.1 | 11.3 | 7.2 | 3.8 | 3.2 | 7.67 | 1.32 |
| 40 | 2.8 | 3.7 | 4.5 | 7.3 | 9.0 | 14.8 | 15.1 | 9.5 | 4.9 | 3.8 | 7.54 | -0.40 |
| 60 | 1.6 | 2.3 | 2.8 | 4.3 | 5.4 | 8.6 | 17.4 | 15.6 | 8.3 | 5.7 | 7.20 | -4.89 |
| 85 | 0.8 | 1.2 | 1.5 | 2.0 | 2.7 | 4.5 | 9.8 | 20.0 | 16.0 | 10.6 | 6.91 | -8.72 |
| 105 | 0.5 | 0.8 | 1.0 | 1.4 | 1.9 | 3.1 | 6.6 | 13.9 | 23.3 | 18.6 | 7.11 | -6.08 |
| 125 | 0.4 | 0.7 | 0.9 | 1.2 | 1.6 | 2.7 | 4.5 | 10.2 | 18.7 | 29.8 | 7.07 | -6.61 |

FIG. 4B  CURIE POINTS OF RESPECTIVE CERAMIC SHEETS.

| | S1 | S2 | S3 | S4 | S5 | S6 | S7 | S8 | S9 | S10 |
|---|---|---|---|---|---|---|---|---|---|---|
| CURIE POINT (°C) | -59 | -42 | -25 | 10 | 22 | 35 | 53 | 79 | 104 | 125 |

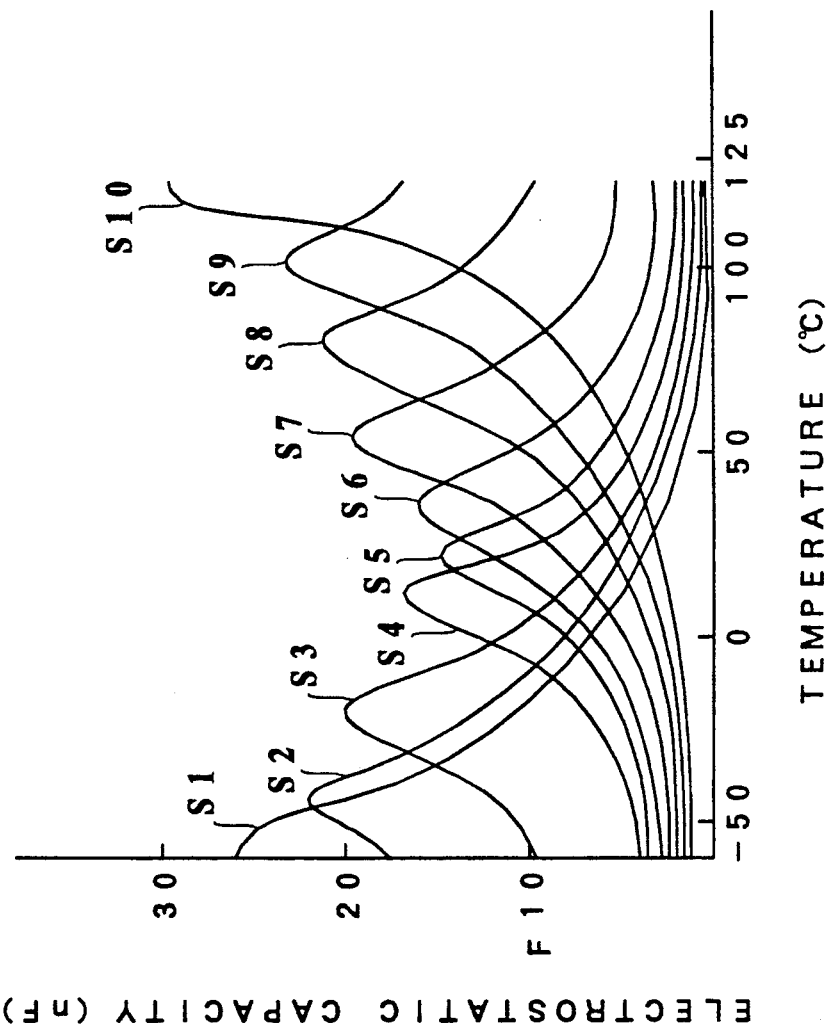

MULTILAYER CERAMIC CAPACITOR AND METHOD OF MANUFACTURE THEREOF

BACKGROUND OF THE INVENTION

1. Field of the Invention

The present invention relates to a multilayer ceramic capacitor and a method of manufacture thereof and, more particularly, to structure and a method of manufacture of a multilayer ceramic capacitor which realizes a low rate of change in electrostatic capacity, a small size, high capacity and low manufacturing cost.

2. Description of the Prior Art

A multilayer ceramic capacitor is used as a kind of capacitor and its ability to store an electric charge is given by electrostatic capacity. The rate of change in the electrostatic capacity resulting from temperature change is desirably as small as possible. In general, the capacitor having X7R characteristic is commonly used, in which the rate of change in electrostatic capacity is within ±15% in the temperature range of −55° C. to +125° C. However, if the Curie point of a ceramic acting as dielectric substance lies between −55° C. to +125° C., the electrostatic capacity thereof varies markedly depending on the change in ambient temperature. As a result, the capacitor function may be deteriorated.

For example, if a dielectric substance has the Curie point K1 of around −5° C. as shown in a curve 81 of FIG. 1A, electrostatic capacity decreases more than 20% at 60° C. or more. This is responsible for the malfunction of the capacitor.

In order to prevent such a problem, there is a way of varying the temperature characteristic by adding further chemical component to a ceramic material consisting mainly of barium titanate. This treatment serves to shift the Curie point to thereby make the electrostatic capacity stable. However, although this method is capable of decreasing the change in electrostatic capacity, it also reduces the dielectric constant down to the range of 2000 to 3000, leading to another problem that a large electrostatic capacity cannot be obtained.

Another way is to form a multilayer ceramic capacitor by laminating a plurality of ceramics having different Curie points. For instance, if a ceramic whose temperature characteristic is shown in a curve 81 of FIG. 1A is combined with another ceramic whose temperature characteristic is shown in a curve 82, the resulting ceramic capacitor has two Curie points and the rate of change in electrostatic capacity can be reduced on the basis of the logarithmic mixing law.

The conventional multilayer ceramic capacitor described above has the following problem. When manufacturing the above-mentioned capacitor, ceramic materials having different Curie points are first laminated and thereafter they are subjected to sintering as one united body. However, in this sintering step, ceramic materials are made to diffuse into one another. This is responsible for the problem that respective Curie points are nearly equalized. Due to this problem, it is impossible to construct a multilayer dielectric ceramic structure having a plurality of Curie points. As a result, the rate of change in electrostatic capacity cannot be reduced.

In order to prevent the above problem, another type of multilayer ceramic capacitor has been proposed in Japanese laid open publication No. SHO 64-64210(P). This multilayer ceramic capacitor is outlined in FIG. 1B. There are provided a plurality of first internal electrodes N1 and a plurality of second internal electrodes N2 in alternate order inside the capacitor. A first external electrode G1 and a second external electrode G2 are connected to side ends of respective internal electrodes. The capacitor shown in FIG. 1B employs two kinds of ceramics 85 and 86 as dielectric substance, each ceramic having different Curie point from one another.

An empty layer 87 is provided between ceramics 85 and 86, isolating two ceramics from one another. By the presence of the intervening empty layer 87, diffusion of ceramic materials in the sintering step can be hindered, thus preventing Curie points of respective ceramic materials from being equalized. This realizes a low rate of change in electrostatic capacity, with the dielectric constant maintained in high level.

However, the multilayer ceramic capacitor shown in FIG. 1B has the following problem. Although the empty layer 87 formed in the capacitor serves to relieve the diffusion of ceramic materials in the sintering step, it hinders the miniaturization of the capacitor due to its own space. In particular, it is necessary to laminate a large number of ceramic materials having different Curie points in order to make electrostatic capacity more stable. In such a case, empty layers should be formed between every adjoining ceramic materials. Consequently, the miniaturization of the capacitor is markedly hindered.

In addition, because the ceramic capacitor is formed by sintering at 1000° C. or more, internal electrodes must be made of a heat resisting material such as palladium or the like. This results in the problem that the production cost of the capacitor is raised.

OBJECTS AND SUMMARY OF THE INVENTION

An object of the present invention, therefore, is to overcome the aforementioned problems and provide structure and a method of manufacture of a multilayer ceramic capacitor which realizes a low rate of change in electrostatic capacity, a small size, high capacity and low manufacturing cost.

According to a feature of the invention, there is provided a method for manufacturing a multilayer ceramic capacitor comprising the steps of:

laminating a plurality of dielectric ceramic materials which are capable of sintering and have different Curie points from each other in such a manner that an intervening combustible material are placed between every adjoining ceramic materials, the intervening combustible material being incinerated when sintered, to thereby form a multilayer material;

subjecting the multilayer material to sintering to thereby obtain a ceramic, the combustible material being incinerated so as to form an empty layer; and forming an internal electrode in the empty layer.

According to a further feature of the invention, there is provided a multilayer ceramic capacitor comprising:

a plurality of ceramic dielectric substances having different Curie points, being intervened by a plurality of empty layers which are formed by incineration when sintered;

a plurality of internal electrodes which are formed in the empty layers, being made up of a first internal electrode and a second internal electrode arranged in alternate order;

a first external electrode which is electrically connected to the first internal electrode; and a second external electrode which is electrically connected to the second internal electrode.

According to a still further feature of the invention, there is provided a multilayer ceramic capacitor comprising:

a plurality of ceramic dielectric substances having different Curie points;

a plurality of internal electrodes which are provided between every adjoining ceramic dielectric substances, being made up of a first internal electrode and a second internal electrode arranged in alternate order;

a first external electrode which is electrically connected to the first internal electrode; and a second external electrode which is electrically connected to the second internal electrode.

While the novel features of the invention are set forth in a general fashion, particularly in the appended claims, the invention, both as to organization and content, will be better understood and appreciated, along with other objects and features thereof, from the following detailed description taken in conjunction with the drawings.

BRIEF DESCRIPTION OF THE DRAWINGS

FIGS. 4A and 4B are tables, wherein: FIG. 4A shows electrostatic capacity and rates of change in electrostatic capacity at specified temperatures in the multilayer ceramic capacitor shown in FIG. 2; and FIG. 4B shows Curie points of respective ceramic sheets.

FIG. 5 is a graph representing the electrostatic capacity, shown in FIG. 4A.

DESCRIPTION OF THE PREFERRED EMBODIMENT

Figure 1A:
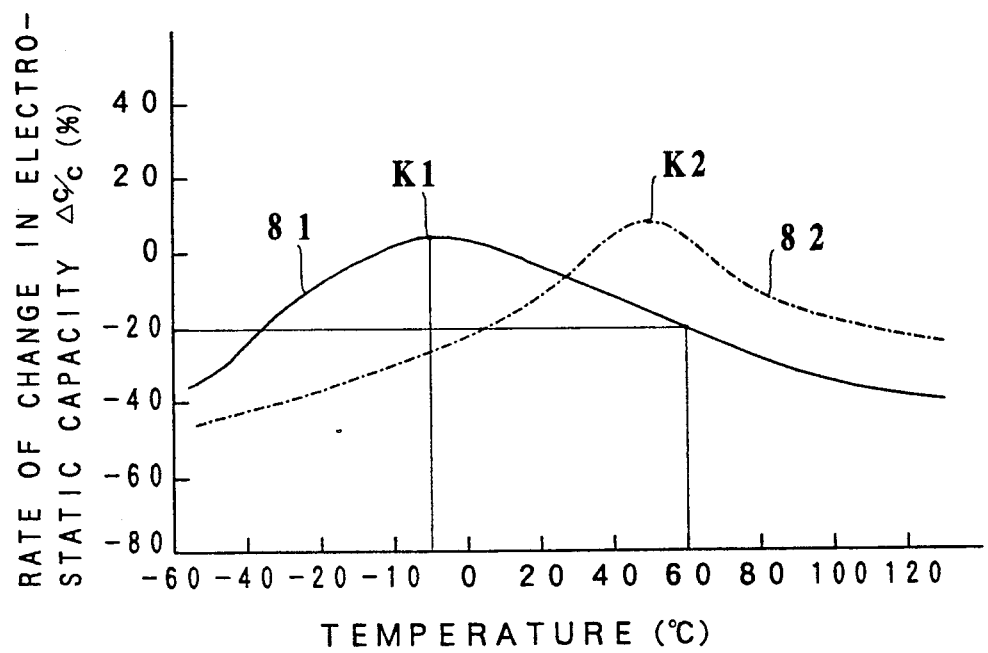
FIGS. 1A and 1B are diagrams explanatory of a conventional multilayer ceramic capacitor.
Figure 1B:
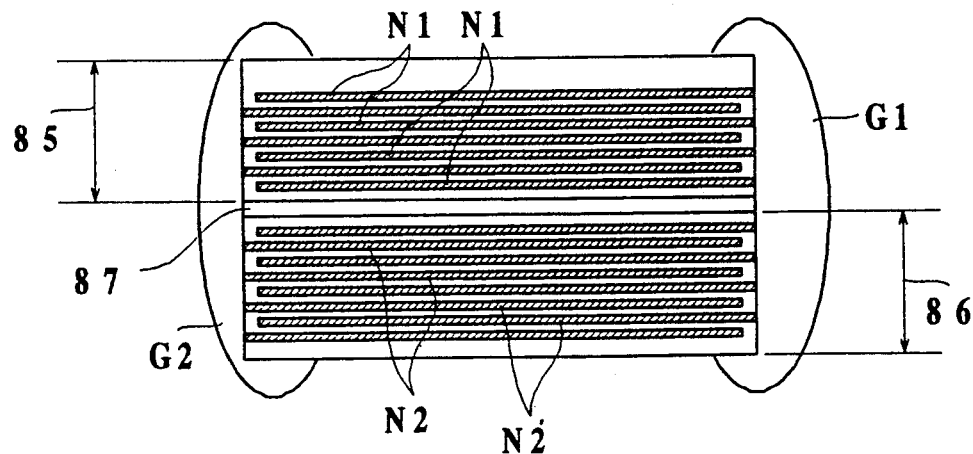
Figure 2:
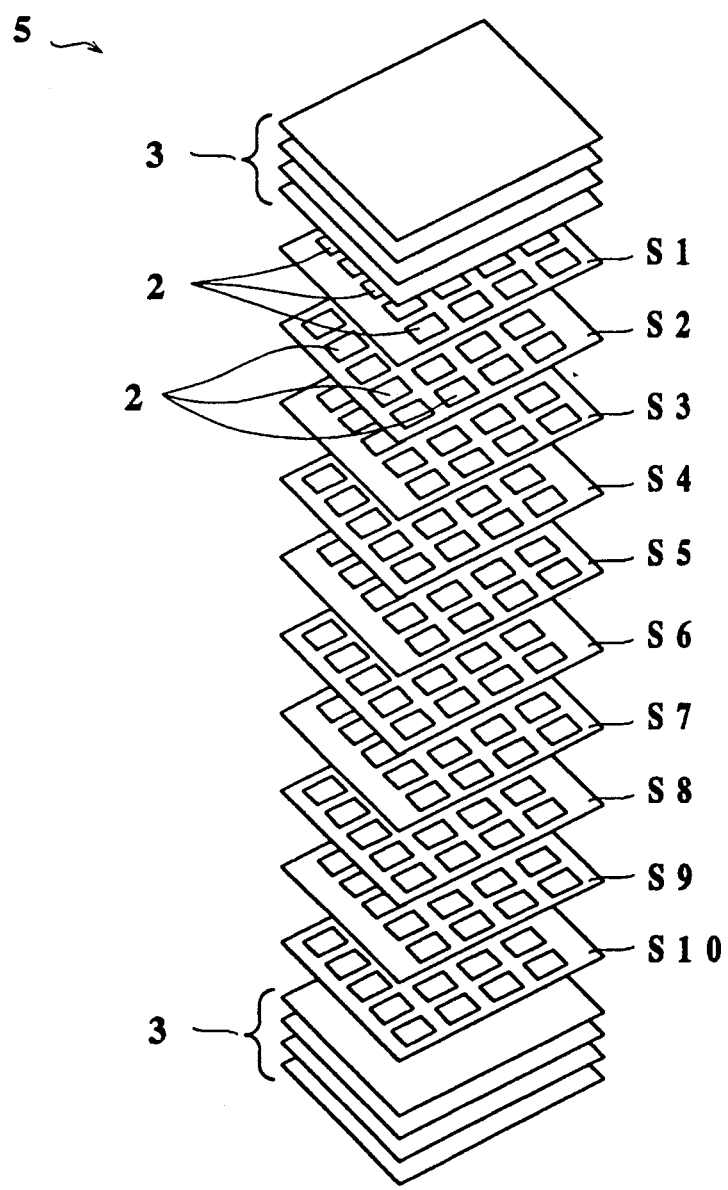
FIG. 2 is a perspective view showing the structure of a multilayer ceramic capacitor according to an embodiment of the present invention.

A multilayer ceramic capacitor and a manufacturing method thereof according to an embodiment of the present invention will be explained in accordance with drawings. In this embodiment, as shown in FIG. 2, ten ceramic sheets S1, S2, S3, S4, S5, S6, S7, S8, S9 and S10 are employed as ceramic materials. These ceramic sheets ave different Curie points from each other, respectively, as shown in FIG. 4B and FIG. 5.

Every ceramic sheets are applied by carbonaceous ink 2 as combustible material (FIG. 2), which is incinerated and lost in the sintering step. The carbonaceous ink 2 is applied in such a manner that the application position is shifted from that of adjoining sheet in alternate order. This means that the position of the carbonaceous ink 2 on ceramic sheets S1, S3, S5, S7 and S9 is shifted by a specified length from that of the carbonaceous ink 2 on ceramic sheets S2, S4, S6, S8 and S10.

Figure 3A:
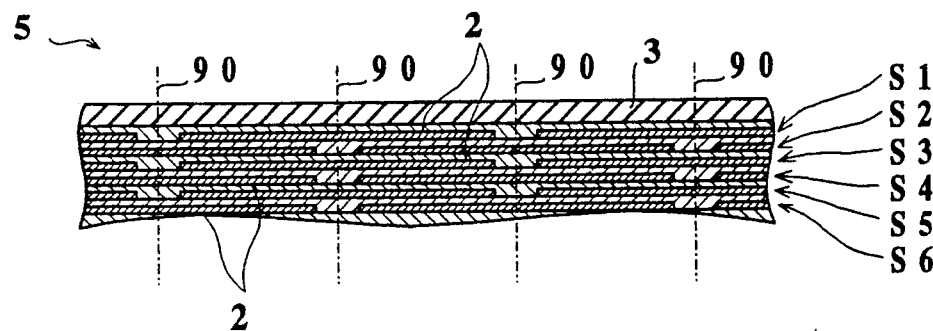
FIGS. 3A, 3B and 3C are cross-sectional views of the multilayer ceramic capacitor shown in FIG. 2.

Every ceramic sheets, upper and lower protective sheets 3 are laminated to form a multilayer material 5. The provision of protective sheets 3 is intended to form protective layers outside the ceramic capacitor. By laminating ceramic sheets, the carbonaceous ink 2 is placed between every adjoining ceramic sheets. The multilayer material 5 thus formed is shown in FIG. 3A. As stated above, the application position of the carbonaceous ink 2 alternates between every adjoining ceramic sheets. By cutting off the multilayer material 5 along cutting lines 90 shown in FIG. 3A, a plurality of multilayer severed materials 15 are produced, each having the size of a single capacitor.

Figure 3B:
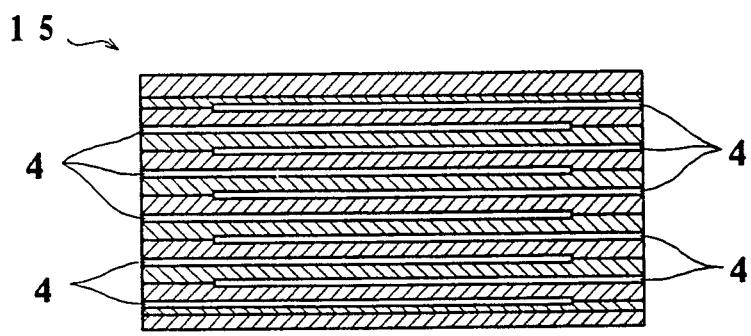

Then, the multilayer severed material 15 is sintered at 1000° C. or more. In this step, the carbonaceous ink 2 applied on each ceramic sheet is incinerated and lost, allowing a plurality of empty layers to be formed. FIG. 3B shows the state in which a plurality of empty layers 4 are formed between every adjoining ceramic sheets after sintering step. As described here, by the presence of intervening empty layers 4 between ceramic sheets having different Curie points, it is possible to prevent the diffusion of ceramic materials in the sintering step.

Next, a plurality of internal electrodes are formed in the empty layers 4 (FIG. 3B) of the multilayer severed material 15. In the present embodiment, lead, tin, or the like is available as material for internal electrode, because the sintering step is performed beforehand. This means that there is no need to form internal electrodes using a heat resisting and oxidation resistant material such as palladium or the like. As a result, the production cost of the capacitor can be reduced. Incidentally, internal electrodes are formed by pouring melted lead, tin, or the like. Lead and tin have advantages that each of them has relatively a low melting point and is subject to melt. Also, nickel is available as internal electrode material.

Figure 3C:
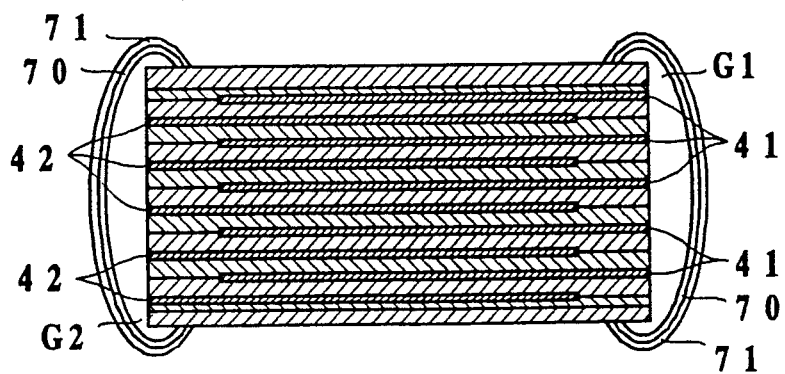

After pouring the internal electrode material, external electrodes G1 and G2 are formed, as shown in FIG. 3C. The external electrode G1 is electrically connected to a first internal electrode 41 out of entire internal electrodes, whereas the external electrode G2 is connected to a second internal electrode 42. External electrodes G1 and G2 are made of silver and glass frit. The outside is covered with nickel 70 and is plated with soft solder 71. Incidentally, the soft solder 71 may be substituted for by tin solder.

FIG. 4A shows the temperature characteristic of the electrostatic capacity in the multilayer ceramic capacitor thus formed. In the figure, there are shown values of electrostatic capacity in respective ceramic sheets at specified temperatures between −55° C. and +125° C. FIG. 5 graphically represents the electrostatic capacity of respective ceramic sheets.

Figure 6:
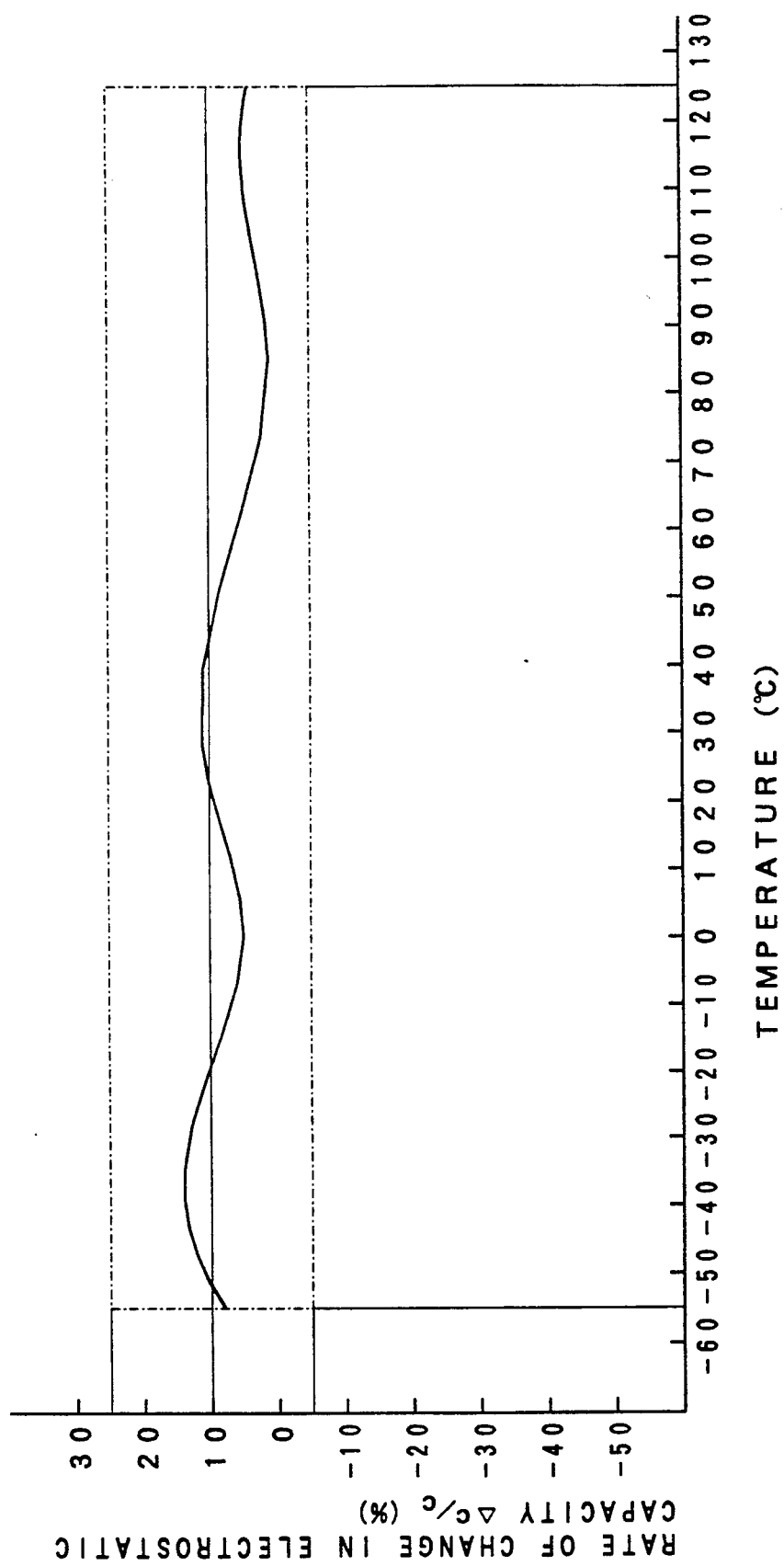
FIG. 6 is a graph representing the relationship between electrostatic capacity and temperature in the multilayer ceramic capacitor shown in FIG. 2.

In FIG. 4A, there are also shown rates of change in electrostatic capacity at specified temperatures, wherein 20° C. is set as base temperature. FIG. 6 graphically represents above rates. As known from the figure, in the multilayer ceramic capacitor of the present embodiment, the rate of change in electrostatic capacity is within ±15% between −55° C. and +125° C. This satisfies the X7R characteristic.

Also, the dielectric constant $\epsilon$ of a capacitor is given by the following expression <1>.

$$\epsilon = C \cdot d / S \qquad <1>$$

In the above expression, C, d and S are a value of electrostatic capacity [pF], a distance between electrodes [μm] and an electrode area [mm$^2$], respectively. Accordingly, the dielectric constant $\epsilon$ of the multilayer ceramic capacitor of the present invention is given by:

$$7570[pF] \times 1000[\mu m]/8854[mm] \times 165\ [mm] = 5182$$

As known from the above expression, the multilayer ceramic capacitor of the present invention can provide a low rate of change in electrostatic capacity and a high dielectric constant (e.g. 5182).

In the multilayer ceramic capacitor according to the present invention or the manufacturing method thereof according to the present invention, by the presence of intervening empty layers between every adjoining ceramic sheets, it is possible to prevent the diffusion of ceramic materials in the sintering step. As a result, the multilayer ceramic capacitor having a plurality of Curie points can be obtained. Therefore, it is possible to both maintain the dielectric constant in high level and reduce the rate of change in electrostatic capacity.

Further, internal electrodes are formed in empty layers, so that there is no empty layer in the resulting multilayer ceramic capacitor. Moreover, material other than a heat resisting and oxidation resistant metal is available as internal electrode material, because internal electrodes are formed after ceramic materials are sintered. Consequently, it is possible to form internal electrodes using an inexpensive material, allowing the production cost of the capacitor to be reduced.

In the multilayer ceramic capacitor of the present invention, due to the presence of internal electrodes between ceramic dielectric substances having different Curie points, it is possible to prevent ceramic dielectric substances from diffusing into one another. The resulting multilayer ceramic capacitor, therefore, has a high dielectric constant and a low rate of change in electrostatic capacity.

Although the invention has been described in its preferred form with a certain degree of particularity, it is understood that the present disclosure of the preferred form has been changed in the details of its construction and any combination and arrangement of parts may be resorted to without departing from the spirit and the scope of the invention as hereinafter claimed.

What is claimed is:

1. A method for manufacturing a multilayer ceramic capacitor, comprising the steps of:
    laminating a plurality of dielectric ceramic materials which are capable of sintering and have different Curie points from each other in such a manner that an intervening combustible material are placed between every adjoining ceramic materials, said intervening combustible material being incinerated when sintered, to thereby form a multilayer material;
    subjecting said multilayer material to sintering to thereby obtain a ceramic, said combustible material being incinerated so as to form an empty layer; and
    forming an internal electrode in said empty layer.

2. A method for manufacturing a multilayer ceramic capacitor as claimed in claim 1, wherein said combustible material is carbonaceous ink.

3. A method for manufacturing a multilayer ceramic capacitor as claimed in claim 1, wherein said combustible material is combustible organic ink.

4. A method for manufacturing a multilayer ceramic capacitor as claimed in claim 1, wherein said internal electrode is made of lead.

5. A method for manufacturing a multilayer ceramic capacitor as claimed in claim 1, wherein said internal electrode is made of tin.

6. A method for manufacturing a multilayer ceramic capacitor as claimed in claim 1, wherein said internal electrode is made of nickel.

7. A multilayer ceramic capacitor, comprising:
    a plurality of ceramic dielectric substances having different Curie points, being intervened by a plurality of empty layers which are formed by incineration when sintered;
    a plurality of internal electrodes which are formed in said empty layers, being made up of a first internal electrode and a second internal electrode arranged in alternate order;
    a first external electrode which is electrically connected to said first internal electrode; and
    a second external electrode which is electrically connected to said second internal electrode.

8. A multilayer ceramic capacitor as claimed in claim 7, wherein said internal electrodes are made of lead.

9. A multilayer ceramic capacitor as claimed in claim 7, wherein said internal electrodes are made of tin.

10. A multilayer ceramic capacitor as claimed in claim 7, wherein said internal electrodes are made of nickel.

11. A multilayer ceramic capacitor as claimed in claim 7, wherein said first external electrode and said second external electrode are made of silver.

12. A multilayer ceramic capacitor as claimed in claim 7, wherein said first external electrode and said second external electrode are made of glass frit.

13. A multilayer ceramic capacitor, comprising:
    a plurality of ceramic dielectric substances having different Curie points;
    a plurality of internal electrodes which are provided between every adjoining ceramic dielectric substances, being made up of a first internal electrode and a second internal electrode arranged in alternate order;
    a first external electrode which is electrically connected to said first internal electrode; and
    a second external electrode which is electrically connected to said second internal electrode.

14. A multilayer ceramic capacitor as claimed in claim 13, wherein said internal electrodes are made of lead.

15. A multilayer ceramic capacitor as claimed in claim 13, wherein said internal electrodes are made of tin.

16. A multilayer ceramic capacitor as claimed in claim 13., wherein said internal electrodes are made of nickel.

17. A multilayer ceramic capacitor as claimed in claim 13, wherein said first external electrode and said second external electrode are made of silver.

18. A multilayer ceramic capacitor as claimed in claim 13, wherein said first external electrode and said second external electrode are made of glass frit.

* * * * *